United States Patent Office 3,100,526
Patented Aug. 13, 1963

3,100,526
METHOD OF CEMENTING WELLS
Robert C. Martin, Tulsa, Okla., assignor to The Dow Chemical Company, Midland, Mich., a corporation of Delaware
No Drawing. Filed Nov. 14, 1960, Ser. No. 68,606
6 Claims. (Cl. 166—31)

The invention is an improved aqueous hydraulic cement composition and a method of cementing wells employing the composition.

Cementing wells, broadly, pertains to sealing off one type of fluid-producing horizon from another, e.g., oil- or gas-bearing strata from water or brine-bearing strata or to securing a casing in place, e.g., cementing the casing off bottom which usually also provides insurance against vertical movement of the casing and provides protection and strength to the encased wellbore by use of an aqueous cement slurry which sets to a monolithic solid in situ. For satisfactory use in a well-cementing operation, the cementing composition must possess certain suitable properties such as satisfactory viscosity, pumpability, thickening and setting times, and ultimate strength.

Although valuable improvements have been suggested over the years to improve the properties of the cement slurries, such improvements have not been fully satisfactory. Some of the problems associated with well cementing operations and progress made in attempts to solve these problems are set forth in the publication entitled Oil-Well Cementing Practices in the United States (1959), published by the American Petroleum Institute, New York, New York.

One problem which has been a source of considerable difficulty in well cementing operations is due to the difficulty of controlling the thickening or setting time of the aqueous cement slurry during its emplacement in position in the well without adversely affecting the viscosity, pumpability, or ultimate strength.

A number of attempts have been made to extend the setting times of an aqueous hydraulic cement slurry without accompanying adverse effects. Among such attempts are admixing, with the aqueous cement slurry, such retardant materials as carboxymethylhydroxyethyl cellulose, calcium lignosulfonate, grain flours, starches, bentonite, casein, and gum arabic.

Although some of such retardants have had a beneficial effect on retarding the setting time of aqueous hydraulic cement slurries, some disadvantages have persisted in their use among which are excessive thickening, difficulty of controlling the thickening and setting time under varying temperature conditions, and the limited number of types of cement with which any given set-control agent may be employed.

A satisfactory cement slurry retardant extends both the thickening and setting times of the cement slurry. Prior to setting, a cement slurry passes through a thickening stage. Care must be exercised in the use of an aqueous cement slurry to avoid movement thereof after thickening has appreciably advanced to avoid impairment of the ultimate strength properties of the set cement. Viscosity is usually considered as a guide to the extent of thickening. When an aqueous hydraulic cement slurry has acquired a viscosity of 100 poises or more it is considered to be too thick for subsequently pumping or otherwise moving it.

A need, therefore, exists for an effective and satisfactory composition and a method of use thereof in well cementing operations which retards the set of cement without accompanying adverse effects such as increased viscosity or lessened ultimate strength.

The invention, accordingly, provides such a composition and method. The composition consists of 100 parts by weight of a hydraulic cement, between 0.025 and about 1.0 part of a retardant to set selected from the class consisting of glucoheptonic acid and water-soluble salts thereof, and water in an amount between 35 and 50 parts per 100 parts by weight of dry cement. Any of the cements described in section VII of API RP 10B, Recommended Practice for Testing Oil Well Cements, which fall under the heading of either Portland or aluminous cements, or pozzolanic cement, prepared from volcanic ash and blast furnace feed, usually enriched with some Portland or aluminous cement.

A description and requirements of the various A.P.I. cements, including maximum permissible amounts in percent by weight of the more critical components of such cements is set out in Oil-Well Cementing Practices in the United States at pages 40 to 47, cited hereinabove.

The preferred retardant to employ in the practice of the invention is sodium glucoheptonate in an amount of between 0.4 and 0.6 percent by weight of the dry cement. Either sodium alpha glucoheptonate or sodium beta glucoheptonate is effective. The formula for sodium alpha glucoheptonate is considered to be:

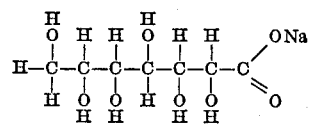

The formula for sodium beta glucoheptonate is considered to be:

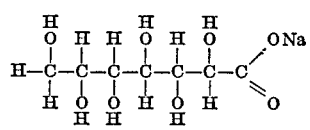

Glucoheptonic acid and the water-soluble salts thereof are readily procurable either as a dry powder or as an aqueous solution thereof. When the solid retardant is employed in the practice of the invention, it may be admixed with the dry cement prior to adding the water thereto, it may be added to the water before the addition of the dry cement, or it may be added to the cement-water slurry. When the aqueous solution of the retardant is employed in the process of the invention, it is usually added either to the water or to the aqueous cement-water slurry. Since the amount of the retardant is relatively small in comparison to the cement, it is preferred to add the retardant to the water before adding the dry cement thereto to insure uniform mixing.

The aqueous cement slurry employed in the practice of the invention may be prepared in a similar manner to the mixing of aqueous cement slurry generally, e.g., a revolving paddle-type cement mixer, either mounted on a truck or fixed upon trunnions positioned in a stationary platform, from which the mixed slurry is pumped down the wellbore to the level desired for the cementing operation. The ingredients may also be dry blended as the composition is being pumped into the well, usually the water containing the retardant being pumped simultaneously into a mixing chamber together with the dry cement and the resulting mixture forced down the wellbore.

A series of test runs was made, some of which are illustrative of the invention and some of which were made for purposes of comparison wherein conditions were substantially the same as in the examples except that not any, or an insufficient amount, of an α-glucoheptonate salt was employed.

The following procedure was employed in the preparation of the aqueous cement slurries employed in this series of runs: a weighed amount of water was placed in a suitable mixing tank. The desired percent by weight of sodium α-glucoheptonate, calculated as a given percent by weight of the dry cement to be used, was admixed with the water. The mixing time employed was usually about 5 minutes. The desired weight of an API cement, either API class A or API class E which are most commonly employed in well cementing jobs, were admixed with the aqueous solution of the sodium α-glucoheptonate. When a class A cement was employed, the proportion of water to cement was 46 parts by weight of water to 100 parts of cement. When a class E cement was employed, the proportion was 40 parts of water per 100 parts of cement.

The thickening time was ascertained in accordance with the procedure set out in section VII of API RP 10B, Recommended Practice for Testing Oil Well Cements and Cement Additives (January 1959), using the Pan American Petroleum Corporation consistometer described in U.S. Patent 2,266,733. The procedure therein described simulates the conditions resulting from pumping a cement down a well to the depth and at a pressure and bottom hole temperature set out in the particular schedule followed. The thickening time of a cement is defined as the length of time required for the cement to reach a viscosity of 100 poises. It should be noted that the schedule selected for the tests, to show the efficacy of the retardant in the composition of the invention and used according to the method of the invention, were among those having the hottest and deepest conditions set out in the schedules, e.g. schedule 10 for testing bottom hole cementing and schedule 19 for testing squeeze cementing. A rather extensive discussion of the thickening test employed herein for aqueous cement slurries is set out in Oil-Well Cementing Practices in the United States, to which reference is made hereinabove, particularly at pages 40 to 47 thereof which also includes a description of the Pan American Petroleum Corporation consistometer.

The results of this series of test runs are set out hereinafter in Table I.

In the tests run of this series, four different commercially available class E cements were employed. They are designated E(1), E(2), E(3), and E(4). Each of the class E cements was employed with varying percents of the sodium α-glucoheptonate in both the bottom hole cementing test, i.e. schedule 10, and in the squeeze cementing test, i.e. schedule 19. A class A cement was also employed with varying amounts of the sodium α-glucoheptonate according to the conditions of schedule 19.

TABLE I

*Effect of Sodium α-Glucoheptonate on Thickening Time of Hydraulic Cements*

| Test run No. | Percent, by weight dry cement, of sodium α-glucoheptonate | API schedule | Class of cement | Thickening time in hrs.: min. |
|---|---|---|---|---|
| 1 | | [1] 19 | Class A | 0:22 |
| 2 | 0.1 | 19 | do | 1:56 |
| 3 | 0.2 | 19 | do | >4:00 |
| 4 | 0.5 | 19 | do | >4:00 |
| 5 | | 19 | Class E(1) | 0:35 |
| 6 | 0.1 | 19 | do | 2:28 |
| 7 | 0.2 | 19 | do | >4:00 |
| 8 | 0.4 | 19 | do | >4:00 |
| 9 | | 19 | Class E(2) | 0:31 |
| 10 | 0.1 | 19 | do | 1:11 |
| 11 | 0.2 | 19 | do | >4:00 |
| 12 | 0.4 | 19 | do | >4:00 |
| 13 | | 19 | Class E(3) | 0:30 |
| 14 | 0.1 | 19 | do | 0:43 |
| 15 | 0.2 | 19 | do | >4:00 |
| 16 | 0.4 | 19 | do | >4:00 |
| 17 | | 19 | Class E(4) | 0:33 |
| 18 | 0.1 | 19 | do | 0:58 |
| 19 | 0.2 | 19 | do | >4:00 |
| 20 | 0.4 | 19 | do | >4:00 |
| 21 | | [2] 10 | Class E(1) | 1:33 |
| 22 | 0.2 | 10 | do | 1:48 |
| 23 | 0.4 | 10 | do | 2:04 |
| 24 | 0.6 | 10 | do | 3:26 |
| 25 | 0.8 | 10 | do | >4:00 |
| 26 | | 10 | Class E(2) | 1:15 |
| 27 | 0.2 | 10 | do | 1:35 |
| 28 | 0.4 | 10 | do | 1:58 |
| 29 | 0.6 | 10 | do | 2:30 |
| 30 [3] | 0.8 | 10 | do | >4:00 |
| 31 | | 10 | Class E(3) | 1:22 |
| 32 | 0.2 | 10 | do | 1:43 |
| 33 | 0.8 | 10 | do | >4:00 |
| 34 | | 10 | Class E(4) | 1:11 |
| 35 | 0.8 | 10 | do | >4:00 |

[1] API casing schedule 10: 18,000 feet well depth; 300° F. bottom hole circulating temperature; 18,800 p.s.i. bottom hole pressure.
[2] API squeeze schedule 19: 14,000 feet well depth; 242° F bottom hole circulating temperature; 14,000 p.s.i. bottom hole pressure.
[3] Test 30 was repeated employing 1% of sodium α-glucoheptonate added as an aqueous solution with no noticeable difference in the result.

NOTE.—Cement slurry: API class A cements, 100 g. cement + 46 g. water; API class E cements, 100 g. cement + 40 g. water.

An examination of the data in Table I shows that the use of between 0.2 percent and 0.5 percent of sodium α-glucoheptonate resulted in at least a 4-hour thickening time according to the tests following schedule 19. It also shows that without any sodium α-glucoheptonate present, the thickening times according to schedule 19 were 35 minutes or less. A thickening time of slightly more than a half hour is definitely insufficient for normal well cementing operations.

Further examination of the data in Table I shows that, although 0.1 percent of sodium α-glucoheptonate resulted in some lengthening of the thickening time of the aqueous cement slurry and 0.2 resulted in appreciable lengthening, according to schedule 10, that best results were obtained employing higher percentages of the sodium α-glucoheptonate, e.g. 0.4 and 0.6.

A second series of test runs was made to ascertain the effect of the retardant employed according to the invention, as illustrated by sodium α-glucoheptonate, on the compressive strength of the set cement.

The procedures followed in preparing the slurries employed in the second series were substantially the same as that of Examples 1–35. The compressive strength tests were ascertained in accordance with procedure described under section V, schedule 7S, 8S, or 9S of Recommended Practice for Testing Oil Well Cements and Cement Additives, API RP 10B (January 1959). The schedule or schedules employed in each test run is set out in Table II which follows:

TABLE II

*Effect of Various Concentrations of Sodium α-Glucoheptonate in a Cement Slurry on the Compressive Strength of the Set Cement*

| Test run No. | Percent, by weight of the dry cement, of sodium α-glucoheptonate | Class of cement | Schedule | | |
|---|---|---|---|---|---|
| | | | 7S | 8S | 9S |
| | | | 24 hr. compressive strength (p.s.i.) at— | | |
| | | | 260° F. | 290° F. | 320° F. |
| 36 | | Clas A | 3,870 | | |
| 37 | 0.4 | do | 7,179 | | |
| 38 | 0.6 | do | 7,250 | | |
| 39 | 0.8 | do | 2,080 | | |
| 40 | | Class E(1) | | | 2,290 |
| 41 | 0.2 | do | | | 2,903 |
| 42 | 0.4 | do | | | 3,723 |
| 43 | 0.6 | do | | | 4,028 |
| 44 | | Class E(2) | 7,391 | | 3,339 |
| 45 | 0.2 | do | 8,426 | | 4,079 |
| 46 | 0.3 | do | | | 3,446 |
| 47 | 0.4 | do | 8,857 | | 3,199 |
| 48 | 0.6 | do | 4,633 | | 5,725 |
| 49 | | Class E(4) | | 2,712 | 2,125 |
| 50 | 0.2 | do | | 4,068 | 3,325 |
| 51 | 0.3 | do | | 4,964 | 3,704 |
| 52 | 0.4 | do | | 4,675 | 3,337 |
| 53 | 0.6 | do | | 5,185 | 3,365 |

Reference to Table II shows that the sodium α-glucoheptonate improves the compressive strengths when employed in amounts up to 0.6 percent based upon the dry weight of the cement used but that the compressive strength appears to drop off when the amount of the sodium α-glucoheptonate is increased to 0.8 percent. It appears from the examples that between about 0.4 and 0.6 percent of the sodium α-glucoheptonate gives best results and that an amount in excess of 1 percent is not to be recommended.

A third series of test runs was run for the purpose of evaluating isomers of sodium heptogluconate. The procedure followed was substantially that employed in the preceding runs. The Portland cement used was Type E and the conditions of the thickening tests were those set out under schedule 10 of section VII of API PP 10B. The amount and identification of the sodium heptogluconate employed in each run and the thickening time are set out in Table III below.

TABLE III

| Test No. | Retarder employed in parts by weight based on 100 parts of cement | Thickening time in hours and minutes |
|---|---|---|
| 54 | 0.4 parts of mixed isomers of α and β isomers of sodium glucoheptonate intermixed with 0.4 parts of water. | >4.00 |
| 55 | 0.4 part of sodium α-glucoheptonate intermixed with 0.4 part of water. | >4.00 |
| 56 | 0.35 part of sodium β-glucoheptonate intermixed with 0.65 part of water. | >4.00 |
| 57 | 0.28 part of sodium β-glucoheptonate intermixed with 0.52 part of water. | >4.00 |

By reference to Table III, it can be seen that either the α isomer or the β isomer or mixture of the sodium salts of glucoheptonic acid markedly extends the thickening time of an aqueous Portland cement slurry under severe conditions as represented by schedule 10.

To cement a well in a field, the following procedure is illustrative of the practice of the invention. The amounts set forth below prepare about one thousand gallons of the aqueous cement composition of the invention.

4650 pounds of water are placed in a suitable mixing tank, 23.3 pounds of sodium glucoheptonate (0.2 percent by weight of the dry cement to be used) is admixed with the water, the mixing time employed usually being about 5 minutes. 11,650 pounds of an API cement, e.g., API class A or E cement, those most commonly employed in well cementing operations, are admixed with the aqueous solution of the sodium glucoheptonate and mixing continued until an aqueous composition of substantial homogeneity is made. The composition thus prepared is pumped or otherwise forced down the wellbore to the level where the cementing is desired to be done. Cementing equipment, including mixers, pumps, and packers or plugs, are employed in the practice of the invention in a similar manner to conventional cementing operations. The aqueous composition, after being emplaced in the well is allowed to stand for a time sufficient for it to become a hard monolithic solid. The length of time necessary for the composition to remain undisturbed, according to practice, may be as little as 4 hours. However, the length of time required before the well can be put back in operation or further work on the well resumed is usually governed by the rules prevailing in the location of the field, and is often about 24 hours.

The value of the aqueous cement composition of the invention and of the method of cementing wells employing the composition is readily seen since a relatively small percent of the glucoheptonate salt admixed with the cement slurry retards the thickening thereof to beyond four hours, a period of time fully adequate for completing a cementing operation, and that in the amounts usually employed in the practice of the invention, it increases the ultimate compressive strength of the set cement. Water-soluble glucoheptonate salts such as that of sodium are relatively inexpensive, readily available, and can be mixed into the dry cement or into the water prior to making of this aqueous cement slurry or into the aqueous cement slurry itself with no added difficulties entailing additional time or expense.

Having described the invention, what is claimed and desired to be protected by Letters Patent is:

1. The method of cementing a well which comprises emplacing in the well an aqueous composition consisting of 100 parts of an hydraulic cement selected from the class consisting of aluminous, Portland, and pozzolanic cements, between 0.025 and 1.0 part of a polyhydroxy aliphatic compound selected from the class consisting of glucoheptonic acid and soluble salts thereof, and sufficient water to make a pumpable slurry which sets to a high strength monolithic solid in situ.

2. The method according to claim 1 wherein the polyhydroxy aliphatic compound is sodium α-glucoheptonate.

3. The method according to claim 1 wherein the polyhydroxy aliphatic compound is sodium β-glucoheptonate.

4. The method according to claim 1 wherein the polyhydroxy aliphatic compound is employed in an amount between 0.2 and 0.6 percent by weight of the dry cement.

5. The method according to claim 1 wherein the cement employed is API class A and the water is employed in an amount between 40 and 50 parts by weight per 100 parts of the cement.

6. The method according to claim 1 wherein the cement employed is class E and the water is employed in an amount between 35 and 40 parts by weight per 100 parts of the dry cement.

References Cited in the file of this patent

UNITED STATES PATENTS

| | | |
|---|---|---|
| 2,588,248 | Klein | Mar. 4, 1952 |
| 2,672,424 | Avery | Mar. 16, 1954 |
| 2,711,219 | Salathiel | June 21, 1955 |
| 2,848,340 | Haldas | Aug. 19, 1958 |
| 2,880,102 | Woodard et al. | Mar. 31, 1959 |